3,152,911
MEAT COOKING METHOD
Asa B. Segur, 1185 S. Ridgeland Ave., Oak Park, Ill.
No Drawing. Filed Sept. 28, 1960, Ser. No. 58,919
6 Claims. (Cl. 99—107)

This invention relates to a method for cooking meat, the method being particularly suitable in the cooking of poultry for the commercial production of chicken and turkey pies, soups, etc.

It has long been known that meat cooked in water loses a substantial portion of its solid and liquid content, as well as its flavor, and that such losses tend to increase with temperature, at least to temperatures approaching 120° C. (248° F.). McCance, R. A., and Shippe, H. L., The Chemistry of Flesh Foods and Their Losses in Cooking, Privy Council, Medical Research Council Bulletin No. 187, London, 1933. While ordinary pressure cooking techniques provide a number of advantages over open-kettle cooking, conventional pressure cooking does not appreciably reduce this loss of liquids and solids from the meat.

Accordingly, a principal object of the present invention is to provide a method for cooking meat in water so that a substantially greater proportion of the juices and flavor are retained in the meat itself. Specifically, it is an object to provide a fast and highly effective method for boiling poultry and other meats under pressure to obtain an increased yield and at the same time to retain more of the flavor of the meat than with open-kettle or conventional pressure cooking methods. Other objects will appear as the specification proceeds.

An important aspect of this invention lies in the discovery that when a sufficiently high pressure is applied to meat *before* it has reached a given minimum cooking temperature and is then maintained throughout the cooking operation until the meat has cooled below such given temperature, a surprising increase in yield occurs in contrast with the yield obtained by open-kettle cooking or by other conventional boiling techniques. Furthermore, it has been found that the meat cooked by the improved method has a more pronounced flavor than the bland flavor ordinarily associated with boiled meat.

In the method of the present invention one or more poultry carcasses are placed within a vessel containing a quantity of water. The water may be pre-heated to a temperature up to approximately 120° F. (49° C.). To facilitate insertion and removal of the carcasses from the vessel, the carcasses are preferably placed within a basket capable of being lifted into and out of the kettle or vessel. After the carcasses have been placed within the kettle, the cover of the kettle is sealed closed and pressure within the vessel is increased by pumping air through an opening in a wall thereof. Ordinarily, such opening will be provided in the cover of the vessel and an adjustable valve will be provided to retain or release the air as desired. A suitable pressure gauge located adjacent the opening will indicate the pressure within the vessel. Since such elements are entirely conventional and form no part of the present invention it is believed that further description herein is unnecessary.

Whether the pressure within the vessel is increased by the introduction of additional quantities of air at the time the vessel is sealed or at a later time does not appear critical as long as pressure is increased within the vessel before its contents have reached a temperature of approximately 120° F. The pressure within the vessel at a temperature of 120° F. should be at least 15 pounds per square inch (p.s.i.) and, in any case, must be substantially greater at 50° F. than the pressure which would have otherwise occurred in the sealed vessel simply by reason of the temperature increase. In other words, the contents of the vessel are under a substantially greater pressure at about 120° F. than the saturated vapor pressure which would exist at that same temperature in a pressure cooker operated in the conventional manner.

With the contents of the vessel at the desired pressure in excess of 15 pounds per square inch at the lower limit of the cooking temperature range (120°–220° F.), continued heating tends further to increase the pressure within the sealed container. Whether this increase in pressure can be tolerated depends primarily upon the strength of the kettle and the selected maximum cooking temperature. Furthermore, no increase in pressure beyond the initial pressure at 120° F. is necessary to obtain the surprising results of the present method, as is evident from the data given by way of illustration in Example I. Suitable valves and pumps may be provided for maintaining the pressure constant throughout the cooking range of 120° to 200° or more, or at least for preventing a reduction in gauge pressure below one atmosphere until the contents have been cooked and then cooled below 120° F.

After sealing the kettle and applying pressure, heating is continued until the desired temperature of 200° to 220° F. is attained. Such a temperature has been found most effective in cooking the meat. The soluble proteins are coagulated and part of the structural proteins are changed to a soluble form. As is well known, connective tissue contains a large proportion of collagen and this collagen is converted to gelatin at the higher cooking temperatures, thereby loosening the connections between the meat, bones and skin of the carcasses.

The duration of the cooking step depends largely upon the nature of the meat and the sizes of the carcasses. For example, in the cooking of chickens in commercial poultry processing operations, hens will ordinarily be cooked at a temperature within the range of 200° to 220° F. for about 45 minutes, cocks will usually be cooked for a longer time ranging between 55 to 60 minutes, and turkeys will be cooked even longer because of their greater size.

It is important that gauge pressure of at least one atmosphere be maintained within the vessel throughout the cooking step and until the temperature of the contents has been reduced to a temperature below approximately 120° F. After the heating has been discontinued the vessel and its contents are allowed to cool, or are preferably cooled by external cooling means, to a temperature below 120° F. and, if necessary, air is pumped into the kettle as its contents are cooled in order to prevent a pressure drop below 15 p.s.i. Rapid cooling achieved by the use of external cooling means, such as by the circulation of cold water through the kettle, appears to have a desirable effect on percentage of yield, perhaps because such rapid cooling prevents prolonged heating and overcooking of the poultry. Finally, when the temperature has dropped below about 120° F., the cover of the vessel is removed and the cooked contents are withdrawn.

It has been found that when the above steps are followed—that is, when a pressure of at least 15 pounds per square inch is applied to the contents of the vessel before the lower limits of the cooking temperature range have been reached, and where the pressure is not reduced until after the contents have again been lowered below the minimum cooking temperature—a surprising increase of approximately 6 to 15 percent in the yield of cooked meat occurs. The basis of comparison is the yield obtained when a similar meat is cooked in an open kettle. However referring to the table of Example IV, it will be observed that the results obtained by the present method are also markedly superior to the yields achieved by using a pressure cooker in the conventional way.

The precise reason for the substantial increase in yield is not known but it is believed that the application of pressure before the lower limit of the cooking temperature range is reached prevents the volatilization of materials in the body cells and also prevents the rupturing of cell membranes by reason of such expansion. As a result, a greater proportion of the material is retained within the cells of the carcass and is not released into the liquid within the vessel. This is demonstrated by the fact that following the cooking method of the present invention the liquid remaining in the vessel is clear, while, in ordinary open-kettle cooking, the liquid has a milky appearance.

The method of the present invention is further disclosed by the following illustrative examples:

Example I

The following table sets forth the conditions and results of a series of cooking tests wherein a gauge pressure of 15 pounds per square inch (approximately one atmosphere) was maintained at all cooking temperatures above 120° F. The poultry was first weighed and then placed into a basket which in turn was positioned in a cooking kettle. Heat was applied to the kettle and, when the temperature reached 120° F., the cover was sealed and air pressure within the kettle increased to a gauge pressure of 15 pounds per square inch. Heating was continued to the maximum cooking temperatures indicated in the table but the internal pressure of 15 p.s.i. was held constant. After a cooking interval, the temperature was reduced by circulating cool water about the kettle and air was injected into the vessel to keep the pressure at 15 p.s.i. gauge. Only after the temperature of the contents had dropped below 120° F. (over a cooling period less than 20 minutes in duration) was the gauge pressure allowed to drop below one atmosphere. In the table, "time" refers to the total time that the poultry was immersed in the water within the kettle, "percentage of recovery" was based on a comparison of the poultry weight before and after cooking, and the "percentage of yield" was the weight percentage of cooked meat (excluding skin) with reference to the original weight of the carcass before being placed in the kettle.

| Pressure at 120° F. | Max. Cooking Temperature, degrees | Cooking Time | Percentage of Recovery | Percentage of Yield |
|---|---|---|---|---|
| 15 | 212 | 87.5 | 76.0 | 41.7 |
| 15 | 212 | 95.5 | 73.0 | 39.0 |
| 15 | 212 | 98.0 | 85.0 | 46.7 |
| 15 | 210 | 167.0 | 74.5 | 43.6 |
| 15 | 212 | 99.0 | 81.0 | 44.2 |
| 15 | 212 | 94.5 | 73.3 | 40.7 |
| 15 | 212 | 93.0 | 72.2 | 37.6 |
| 15 | 212 | 94.0 | 66.0 | 35.0 |
| 15 | 212 | 94.0 | 71.0 | 38.9 |
| 15 | 212 | 92.0 | 88.0 | 41.0 |

The average percentage of yield for the 10 tests was 40.8 percent.

Example II

The method of Example I was followed in the tests of the following table except that the pressure of the contents at 120° F., and at all temperatures thereabove, was maintained at 35 pounds per square inch. The maximum cooking temperature was 212° F. and the average percentage of yield was 40.5 percent.

| Pressure at 120° F. | Cooking Time | Percentage of Recovery | Percentage of Yield |
|---|---|---|---|
| 35 | 91.5 | 80.0 | 43.0 |
| 35 | 94.0 | 73.5 | 38.0 |
| 35 | 91.5 | 76.0 | 39.5 |
| 35 | 89.0 | 76.5 | 41.3 |

Example III

The method of Examples I and II was duplicated using a higher pressure of 50 pounds per square inch at the lower limit (120° F.) of the cooking temperature range. In other respects the method used in obtaining the data of the following table was identical to the method of Example II.

| Pressure at 120° F. | Cooking Time | Percentage of Recovery | Percentage of Yield |
|---|---|---|---|
| 50 | 89.0 | 74.0 | 40.6 |
| 50 | 86.0 | 77.0 | 38.1 |

Example IV

For purposes of comparison, a number of tests were run on poultry of the type and size of Example I but using conventional pressure cooking technique. For each test poultry was placed in a kettle of cool water, the pressure cover was sealed upon the kettle and heat applied, after, a cooking interval at maximum temperature and pressure, the heating means was removed and the contents allowed to cool. The following data sets forth the conditions and results of these tests.

| Max. Cooking Temp. | Max. Pressure (p.s.i. gauge) | Time (minutes) | | | Percent of Recovery | Percent of Yield |
|---|---|---|---|---|---|---|
| | | To reach cooking temp. | At cooking temp. | To cool | | |
| 225 | 3.0 | 19.9 | 35 | 40 | 62.0 | 30.2 |
| 223 | 3.0 | 16.0 | 35 | 55 | 62.1 | 30.7 |
| 225 | 4.0 | 13.1 | 50 | 25 | 67.0 | 34.0 |
| 225 | 4.0 | 12.5 | 37.5 | 20 | 58.0 | 32.6 |

Example V

A series of 10 experiments were run to determine the average yield when the conditions of Example I were duplicated except for the application of pressure. In other words, each lot of chickens were cooked in an open kettle at approximately 212° F. for approximately 90 minutes. The minimum yield for the 10 lots was 31.4 percent, the maximum yield 36.6 percent, and the average yield 34.4 percent.

Example VI

The procedure of Example I was followed, using all of the same general conditions (cooking time approximately 90 minutes, maximum cooking temperature 212° F.) except that the gauge pressure of 15 p.s.i. was not applied until a temperature of 165° F. had been reached and was not released until the contents had been cooled to 165° F. The applied pressure of 15 p.s.i. was held constant at all temperatures above 165° F. In the test cooking of 5 lots of chickens, the minimum yield was 32.9 percent, maximum yield 35.3 percent, and average yield 33.7 percent.

Example VII

The test procedure and conditions of Example VI were repeated with 3 batches of chickens. Minimum yield was 29.7 percent, maximum yield 33.4 percent, and average yield 32.4 percent.

While in the foregoing I have disclosed the method of the present invention in considerable detail it will be understood by those skilled in the art that many of these details may be varied without departing from the spirit and scope of the invention.

I claim:

1. In a meat cooking method wherein meat is cooked in water in a closed vessel at a maximum cooking temperature above 120° F. for the contents of said vessel, the step of maintaining the gauge pressure within said vessel above one atmosphere the entire time that the temperature of the contents of said vessel is above 120° F. and until the temperature of the contents is lowered below 120° F.

2. In a meat cooking method wherein meat is cooked in water in a closed vessel, the steps of introducing air into the vessel before the temperature therein exceeds 120° F. to increase the pressure therein above the saturated vapor pressure of the water, and maintaining such pressure within said vessel the entire time that the temperature of the vessel's contents exceeds 120° F. and until the temperature of the contents is lowered below 120° F.

3. The method of claim 2 in which a gauge pressure of at least one atmosphere is maintained within said vessel at all temperatures above 120° F.

4. In a meat-cooking method wherein meat is heated in water in a sealed vessel to a cooking temperature within the range of 200 to 220° F., the steps of introducing air into said sealed vessel to increase the gauge pressure within said vessel above at least one atmosphere before the temperature of the vessel's contents exceeds approximately 120° F., and maintaining said pressure substantially constant at all temperatures of the vessel's contents above 120° F. and until the temperature of the contents is lowered below 120° F.

5. The method of claim 4 in which said maintaining step includes withdrawing air from said vessel as the temperature increases substantially above 120° F., and thereafter introducing air as said temperature is lowered from the cooking temperature to 120° F.

6. In a high-yield method for pressure cooking meat, the steps of heating the meat in water in a vessel, sealing the vessel and increasing the gauge pressure therein above one atmosphere before the temperature of the vessel's contents exceeds approximately 120° F., cooking said meat within the sealed vessel at a temperature above 120° F. and not exceeding 220° F. while maintaining the pressure within the vessel above one atmosphere, and thereafter cooling the contents of said vessel while maintaining the pressure therein above one atmosphere until the temperature of the vessel's contents drops below approximately 120° F.

References Cited in the file of this patent
UNITED STATES PATENTS

| | | |
|---|---|---|
| 2,778,736 | Wagner | Jan. 22, 1957 |
| 2,827,379 | Phelan | Mar. 18, 1958 |